United States Patent [19]
Boulianne et al.

[11] Patent Number: 6,008,757
[45] Date of Patent: Dec. 28, 1999

[54] SURVEYING PROBE AND METHOD FOR COMPUTING THE SPATIAL COORDINATES OF A POINT

[75] Inventors: Michel Boulianne, Québec; Rock Santerre, Sainte-Foy, both of Canada

[73] Assignee: Université Laval, Ste-Foy, Canada

[21] Appl. No.: 09/173,025

[22] Filed: Oct. 15, 1998

Related U.S. Application Data

[60] Provisional application No. 60/087,837, Jun. 3, 1998, and provisional application No. 60/062,210, Oct. 16, 1997.

[51] Int. Cl.$^6$ ............................... G01S 5/02; H04B 7/185
[52] U.S. Cl. ............................... 342/357.06; 342/357.01; 33/313; 33/366.12
[58] Field of Search ........................ 342/357.01, 357.06; 33/293, 304, 313, 366.12

[56] References Cited

U.S. PATENT DOCUMENTS

| | | | |
|---|---|---|---|
| 4,505,048 | 3/1985 | Sharp | 33/313 |
| 4,509,269 | 4/1985 | Leitz | 33/293 |
| 5,512,905 | 4/1996 | Nichols et al. | 342/357 |

*Primary Examiner*—Thomas H. Tarcza
*Assistant Examiner*—Dao L. Phan
*Attorney, Agent, or Firm*—James Anglehart; Swabey Ogilvy Renault

[57] ABSTRACT

An extendible surveying probe comprises two collinear position detecting units that allow the probe to be used in an inclined position for accessing vertically inaccessible points with a tip thereof. The two position detecting units may consist of two GPS or GLONASS units used in association with another GPS or GLONASS unit installed on a known point or, alternatively, of two corner cubes used in association with a ground total station. The position detecting units provide spatial coordinates of two spaced-apart collinear points which may be used to extrapolate the coordinates of the point in contact with the tip of the probe.

20 Claims, 4 Drawing Sheets

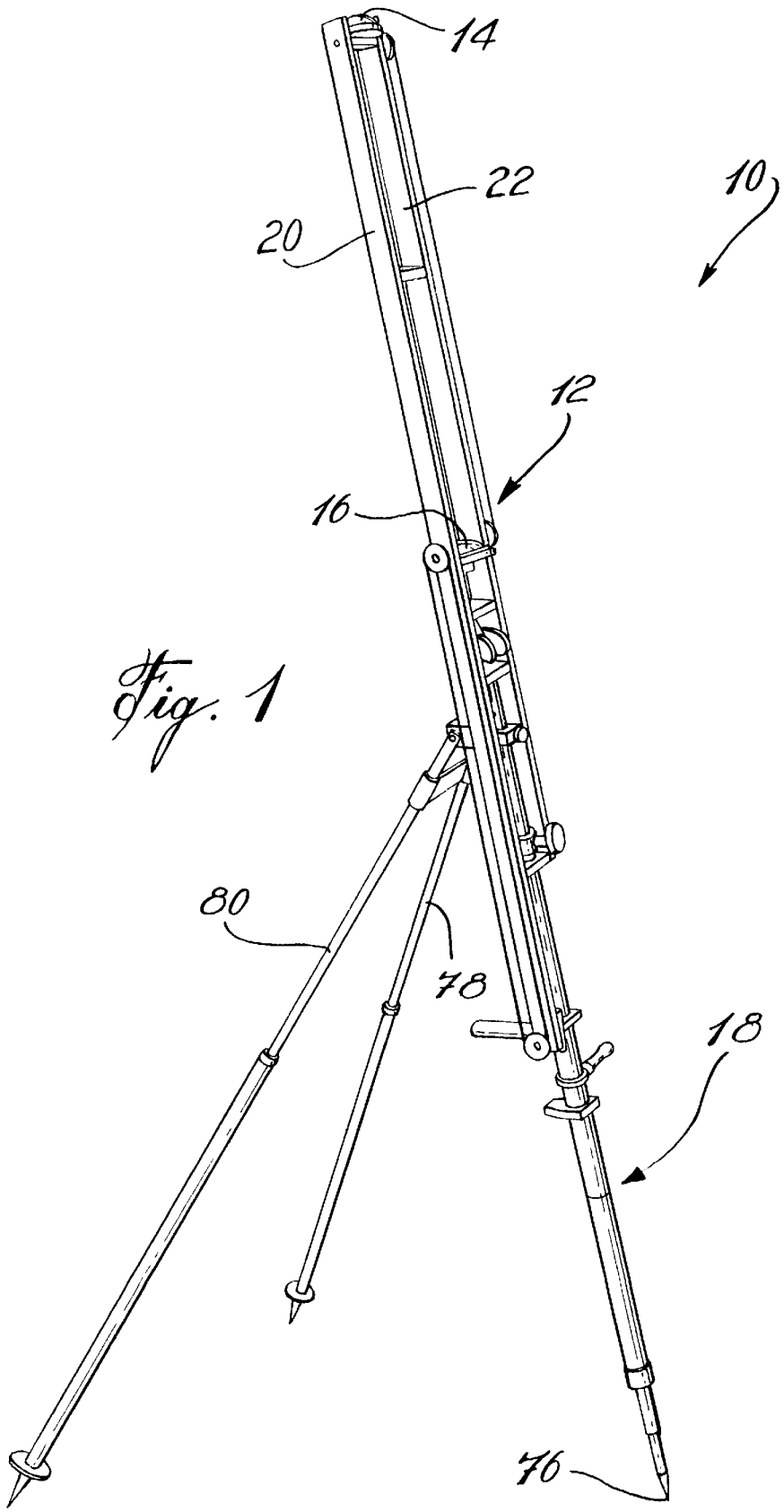

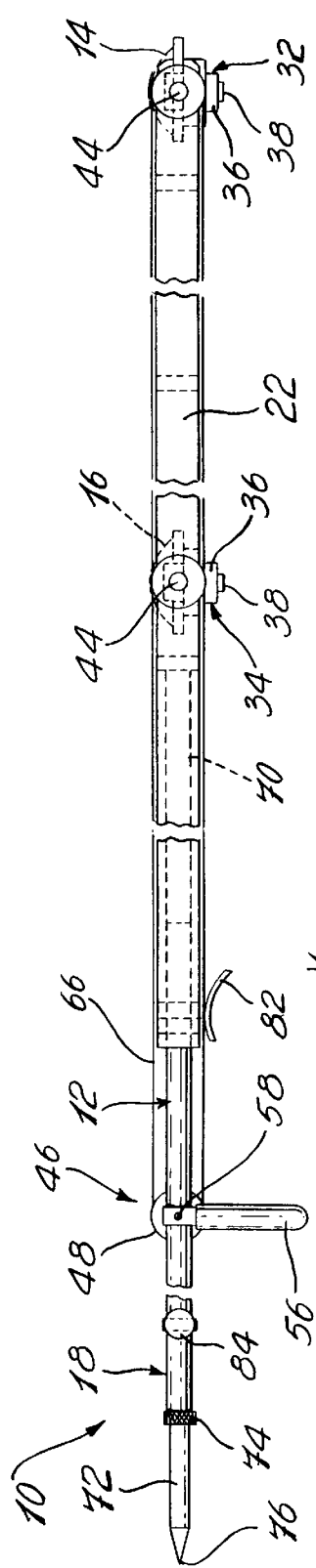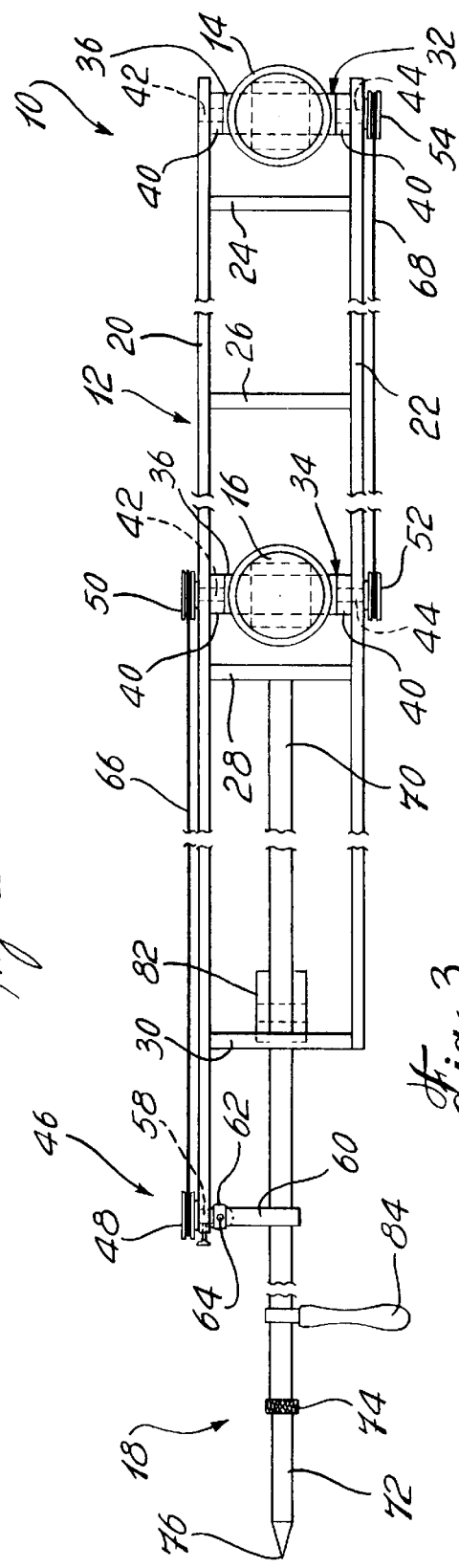

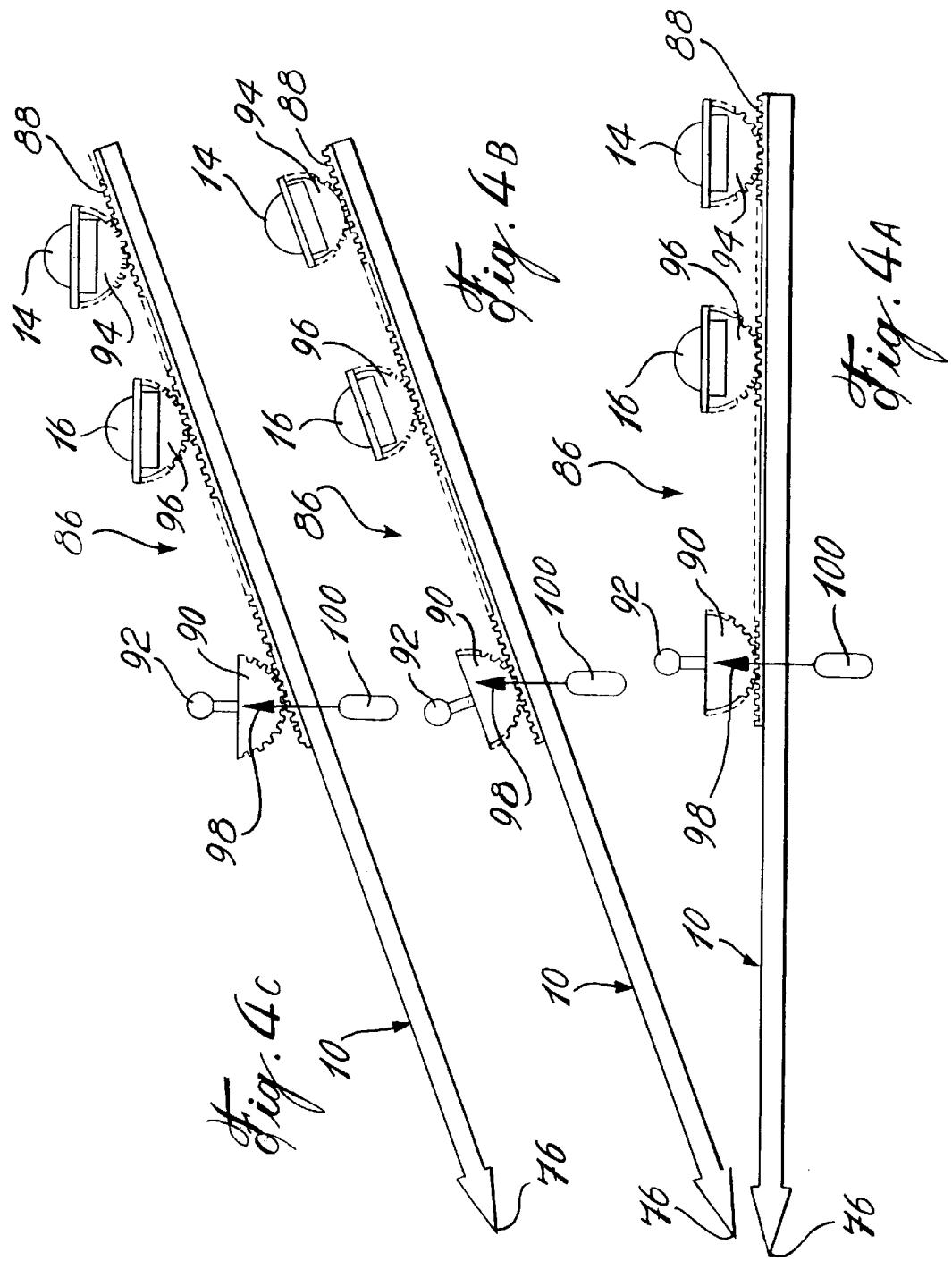

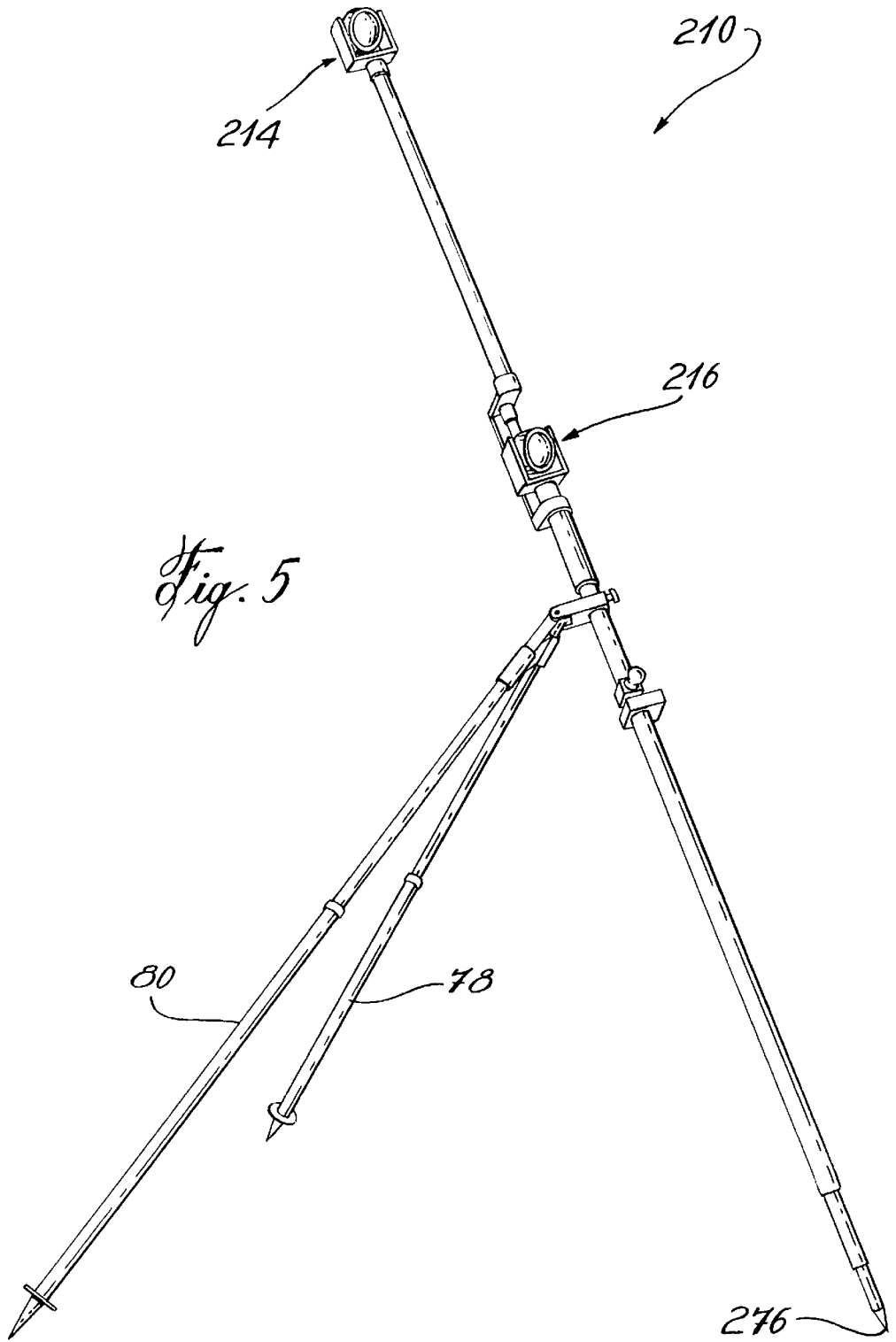

SURVEYING PROBE AND METHOD FOR COMPUTING THE SPATIAL COORDINATES OF A POINT

This application claims benefit of provisional application No. 60/087,837 filed Jun. 3, 1998 which claims benefit of provisional application No. 60/062,210 filed Oct. 16, 1997.

BACKGROUND OF THE INVENTION

1. Field of the Invention

The present invention relates to surveying probes and methods and, more particularly, it pertains to a surveying probe and method which are suitable for computing positions of difficult-to-reach points.

2. Description of the Prior Art

Conventional surveying devices generally include a vertical pole having a prism mounted at a top end thereof and a bottom tip adapted to be placed on a target point whose position is to be determined. A total station including a theodolite and an electronic measuring device targets the prism to determine the spatial coordinates thereof. By holding the pole exactly vertically over the target point and by knowing the distance separating the prism from the tip of the pole, the spatial coordinates of the target point may be readily computed.

Accordingly, to determine the position of a target point which is difficult to reach from above, for instance, a point located at the bottom of a building wall, it is required to first determine the coordinates of at least two surrounding vertically accessible points. Afterwards, direction measurement of the vectors extending between the surrounding points and the target point is used to locate the target point. This method of ascertaining the position of a non-vertically accessible point is time consuming and not very efficient in that the vertical surveying pole and the associated total station must be installed at two different locations to obtain the coordinates of the two surrounding points. Moreover, it has been found that this method does not always provide accurate results.

U.S. Pat. No. 5,512,905 issued Apr. 30, 1996 to Nichols et al. discloses a vertical surveying pole which is adapted to compensate for relatively small out-of-plumb conditions of the pole during measurement taking. The vertical surveying pole is equipped with a GPS unit adapted to determine the position of a GPS antenna disposed at a predetermined distance from a target point, a tilt sensor for providing information about the degree of angular tilt of the pole, and a direction sensor for providing information about the direction of any such tilt. On the basis of the position of the GPS antenna and the information provided by the tilt and direction sensors, the position of the target point may be more accurately computed.

U.S. Pat. No. 4,509,269 issued Apr. 9, 1985 to Leitz discloses a target device for marking points on industrial objects, such as an airplane fuselage, when the sight line and the object surface to be measured form an acute angle. The Leitz's device comprises a rod having a longitudinal axis passing through a target point contained in the object surface. The rod is provided at a lower end thereof with external threads for mounting the rod at a threaded bore whose position is to be determined. Accordingly, in use the rod is normal to the object surface containing the point to be measured. The rod is provided with a pair of spaced-apart mark balls which are disposed on the longitudinal axis of the rod at known spacing from each other and from the target point whose coordinates are to be determined. The coordinates of the mark balls are determined by two spaced angle measuring instruments. Knowing the distance between the mark balls and the distance separating at least one of the mark balls from the target point, the spatial coordinates of the latter may be readily calculated.

Although the devices described in the above-mentioned Patents perform satisfactorily in many applications, it has been found that there is a need for a surveying probe which can be used for computing the position of difficult-to-reach points, especially, in situations where the surveying pole has to be inclined to access the target point with the tip end thereof.

SUMMARY OF THE INVENTION

It is therefore an aim of the present invention to provide a surveying probe and method which are suitable for computing positions of difficult-to-reach points, for instance, where conventional vertical pole cannot be used.

It is also an aim of the present invention to provide such a probe which can be operated in an inclined position.

It is a further aim of the present invention to provide such a probe which is easy to transport.

Therefore, in accordance with the present invention, there is provided a surveying probe for ascertaining spatial coordinates of a target point. The probe comprises an inclined elongated body having a longitudinal axis and a tip for contacting the target point. The inclined elongated body has position detecting means mounted thereon for ascertaining spatial coordinates of at least two spaced-apart points disposed on the longitudinal axis of the elongated body. These two points are each located at a predetermined distance from the tip. The distance is invariant as function of an angle of inclination which is such that the tip reaches a difficult-to-reach point substantially vertically inaccessible. The probe further includes support means spaced from the tip for supporting the elongated body at the inclined angle.

In accordance with another general aspect of the present invention, there is provided a surveying probe for ascertaining spatial coordinates of a target point, comprising an inclined elongated body having a longitudinal axis and a tip for contacting the target point. The inclined elongated body has first and second satellite navigation system radiowave receiving antennas adjustably mounted thereon for simultaneously ascertaining spatial coordinates of at least two spaced-apart points disposed on the longitudinal axis of the elongated body. The first and second satellite navigation system radiowave receiving antennas each are located at a predetermined distance from the tip. The distance is invariant as function of an angle of inclination. The inclination of the elongated body is such that the tip thereof reaches a substantially vertically inaccessible target point, whereby spatial coordinates of the target point may be extrapolated from said two spaced-apart points.

In accordance with a further general aspect of the present invention, there is provided a method of ascertaining spatial coordinates of a target point by extrapolation from at least two spaced-apart points, comprising the steps of:

a) putting a tip of an inclined surveying probe in physical contact with a substantially vertically inaccessible target point whose spatial coordinates have to be determined;

b) while maintaining the tip in contact with the target point, measuring spatial coordinates of a sufficient number of points on the inclined surveying probe to enable extrapolation of the spatial coordinates of the target point from these points.

BRIEF DESCRIPTION OF THE DRAWINGS

Having thus generally described the nature of the present invention, reference will now be made to the accompanying drawings, showing by way of illustration a preferred embodiment thereof, and in which:

FIG. 1 is a perspective view of a surveying probe held in an inclined position by a removable bipod structure in accordance with the present invention;

FIG. 2 is a side plan view of the surveying probe shown without the bipod structure thereof;

FIG. 3 is a top plan view of the surveying probe shown without the bipod structure thereof;

FIGS. 4a to 4c are schematic side plan views of the surveying probe illustrating a variant of an antenna levelling mechanism thereof; and FIG. 5 is a perspective view of a surveying probe provided with a pair of spaced-apart prisms in accordance with a second embodiment of the present invention.

DESCRIPTION OF THE PREFERRED EMBODIMENTS

Now referring to the drawings, and in particular to FIGS. 2 and 3, a surveying probe in accordance with the present invention and generally designated by numeral 10 will be described.

The surveying probe 10, as will be explained hereinafter, is adapted to be used in an inclined position for taking precise location data even in situations where it is difficult or impossible to place the probe directly over or under the point whose position is required to be known. For instance, the surveying probe 10 may be used to ascertain the spatial coordinates of a point which is not vertically accessible.

Basically, as seen in FIGS. 2 and 3, the surveying probe 10 includes a frame structure 12 on which a pair of spaced-apart Global Positioning System (GPS) or GLONASS antennas 14 and 16, and a telescopic pole 18 are mounted. The surveying probe 10 is preferably made of light non-metallic materials so that it is light and easy to transport and so that it does not interfere with the electro-magnetic wave captured by the GPS antennas 14 and 16.

The frame structure 12 comprises first and second longitudinal members 20 and 22 connected to each other by means of transversal members 24, 26, 28 and 30. The transversal members 28 and 30 define a pair of axially aligned circular holes through which the telescopic pole 18 extends. The circular hole of each transversal members 28 and 30 is intersected by a threaded hole (not shown) for receiving a bolt (not shown) in order to fasten firmly the telescopic pole 18 to the frame structure 12.

The GPS antennas 14 and 16 are mounted to respective brackets 32 and 34 which are pivotally mounted to the first and second longitudinal members 20 and 22. More specifically, the brackets 32 and 34 each include an antenna platform 36 defining a central hole through which a screw 38 extends to threadably engage a base portion of an antenna in order to secure the same to the platform 36. A pair of side plates 40 extend at right angle from opposed ends of each antenna platform 36. The side plates 40 of each brackets 32 and 34 are provided with respective coaxial lateral pivot pins 42 and 44 which are adapted to be received in coaxial holes defined in the first and second longitudinal members 20 and 22.

As seen in FIG. 3, the telescopic pole 18 and the GPS antennas 14 and 16 are mounted to the frame structure 12 so as to be coaxial.

In operation, it is preferable that the GPS antennas 14 and 16 always remain horizontal to ensure that accurate location measurements are taken. Accordingly, the surveying probe 10 is provided with a levelling mechanism 46 for allowing a surveyor to control the horizontality of the two GPS antennas 14 and 16. The levelling mechanism 46 generally includes a pulley system, composed of four pulleys 48, 50, 52 and 54, which may be manually operated by means of an antenna levelling handle 56.

More particularly, as seen in FIG. 3, the pulley 48 is fixedly mounted at a first end of an axle 58 extending through a hole defined at a lower end of the first longitudinal member 20 and into a hole defined in a support 60 secured onto an external tube of the telescopic pole 18. The antenna levelling handle 56 is mounted onto the axle 58 for rotating the same in a desired direction. A bracket 62 is provided at the proximal end of the antenna levelling handle 56 for supporting a plumb level 64 which can be used to control the horizontality of the antenna platforms 36, as will be explained hereinafter.

The pulley 50 is fixedly mounted at the free end of the lateral pivot pin 42 of the bracket 34 and is connected to the pulley 48 by means of an endless flexible member 66 such as a wire. Hence, the bracket 34 will rotate conjointly with the axle 58 upon operation of the antenna levelling handle 56.

The pulleys 52 and 54 are respectively fixedly mounted on the lateral pivot pins 44 of the brackets 34 and 32. An endless flexible member 68 is engaged with the pulleys 52 and 54 to transmit the rotation imparted to the bracket 34 to the bracket 32. Therefore, the axle 58 and the two brackets 32 and 34 will rotate conjointly.

As seen in FIG. 3, the brackets 32, 34 and 62 are mounted to the surveying probe 10 so as to be simultaneously horizontally disposed. Therefore, when the surveyor will operate the antenna levelling handle 56 to adjust the horizontality of the level mounting surface of the bracket 62 according to the information provided by the plumb level 64, the surveyor will automatically adjust the horizontality of the GPS antennas 14 and 16 respectively mounted to the brackets 32 and 34.

As seen in FIGS. 2 and 3, the telescopic pole 18 includes a tubular member 70 in which a post 72 is slidably mounted. A collet 74 is provided for holding the post 72 in a desired extended position relative to the tubular member 70. For illustrative purposes, the telescopic pole 18 is shown in FIGS. 2 and 3 in a partially retracted position. According to a preferred embodiment of the present invention, the length of the telescopic pole 18 may vary from about 2.5 to about 3.5 meters.

The telescopic pole 18 allows the surveying probe 10 to reach more distant difficult-to-reach places when in its deployed position, without being too encumbering during transportation.

The post 72 is provided with a tapered tip 76 for contacting a point whose spatial coordinates are required to be known. The post 72 may be scaled to determine the portion of length thereof which extends beyond the bottom end of the tubular member 70. Alternatively, the surveying probe 10 may include a linear transducer to obtain the required length information of the telescopic pole 18.

As shown in FIG. 1, a pair of telescopic sticks 78 and 80 may be removably and pivotally mounted to a bracket fixed to the frame structure 12 of the surveying probe 10 to form a tripod in combination with the telescopic pole 18. When deployed, the tripod allows the surveying probe 10 to stand fixed on its own. Alternatively, a surveyor may hold the surveying probe 10 in a fixed position by means of the shoulder support 82 and the handle 84 mounted on the tubular member 70.

The GPS antennas 14 and 16 are each connected by cable to a GPS receiver (not shown) adapted to decode the GPS satellite signals received by the antenna. The GPS receivers (not shown) are connected to a data storage device (not shown) in order to accumulate data received from the GPS satellites for future analysis by software program. Two batteries (not shown) are also provided for powering the GPS receivers and antennas. It is also contemplated to provide a single GPS receiver, data collector and battery for receiving the signals of both GPS antennas 14 and 16.

In operation, the tip 76 is first placed in physical contact with a target point whose spatial coordinates must be computed. The fact that the probe 10 may be employed in an inclined position, as seen in FIG. 1, and that its length may be extended, allows the probe 10 to reach more distant places, and places that could not have been reached with a conventional vertical surveying pole. Once the tip 76 of the surveying probe 10 is held in physical contact with the target point of unknown coordinates, either with the help of the bipod structure, i.e. the sticks 78 and 80, or the shoulder support 82 and the handle 84, the spatial coordinates of the two GPS antennas 14 and 16 are determined. Then, knowing the exact distance separating the two collinear GPS antennas 14 and 16 and respective coordinates thereof, the unitary vector defining the direction of the axis passing through the GPS antennas 14 and 16 and the tip 76 of the surveying probe 10 is computed. The unitary vector is then multiplied by the distance separating one of the antennas 14 and 16 from the tip 76. Knowing the coordinates of the antennas used in the previous step, the spatial coordinates of the tip 76 may be readily calculated. Since the tip 76 of the probe 14 is maintained in physical contact with the target point, the coordinates of the latter are the same as the coordinates of the tip 76.

Therefore, knowing the accurate coordinates of the two GPS antennas 14 and 16, the distance between the two GPS antennas 14 and 16 and the distance separating the same from the probe tip 76, the spatial coordinates of the target point may be readily extrapolated by vector calculations.

It is noted that to obtain centimeter accuracy in positioning, another GPS receiver is installed on a known point (hereinafter referred to as a reference station). No visibility is needed between the probe and the reference station.

According to a preferred embodiment of the present invention, dual-frequency GPS receivers are used and the two GPS antennas 14 and 16 are mounted to the surveying probe 10 at exactly 86 cm from each other in order to both eliminate phase ambiguities and provide quick determination of the position of the target point. The preferred distance for mounting the GPS antennas 14 and 16 is found by combining two conditions: first, to place the GPS antennas 14 and 16 as far as possible from each other in order to increase precision for the vector calculation and reduce the antennas self-obstruction and second, to place the GPS antennas 14 and 16 at less than 86 cm in order to eliminate phase ambiguities on the wide lane and to obtain instantly the vector between the two GPS antennas. When the spacing between the GPS antennas 14 and 16 is more than 86 cm or when single frequency receivers are used, extra algorithm and calculation are required to compensate for the induced phase ambiguities.

It is also understood that the coordinates of the two GPS antennas 14 and 16 should be simultaneously determined to thus ensure that the GPS satelittes coordinates and clock errors be the same in the observations measured at both GPS antennas 14 and 16, thereby providing more accurate results.

FIGS. 4a to 4c illustrate a variant of the antenna-levelling mechanism of the surveying probe 10 in which a rack and pinion system 86 is used instead of the above described pulley system. The rack and pinion system 86 includes a straight-toothed rack 88 slidably mounted to a rail (not shown) extending along the upper portion of the surveying probe 10. A gear-wheel 90, driven by a handle 92, is engaged with the straight-toothed rack 88 to linearly displace the same along the surveying probe 10. The GPS antennas 14 and 16 are respectively mounted to first and second semi-spherical or semi-cylindrical toothed supports 94 and 96 meshed with the straight-toothed rack 88. Accordingly, the rotational movement imparted to the gear-wheel 90 by the handle 92 will be communicated to the toothed supports 94 and 96 through the straight rack 88. As seen from FIGS. 4a through 4c, the horizontality of the GPS antennas 14 and 16 may be adjusted by pivoting the handle 92 so as to align the same with a zenith indicator 98 from which depends a verticality weight loo.

As shown in FIG. 4a, when the surveying probe 10 is horizontally disposed, the GPS antennas 14 and 16 are horizontal and the handle 92 is aligned with the zenith indicator 98. However, when the surveying probe 10 is inclined, as shown in FIG. 4b, the GPS antennas 14 and 16 are no longer horizontal and the handle 92 is angled to the zenith indicator 98. By pivoting the handle 92 in the clockwise direction up to a position where the handle is aligned with the zenith indicator 98, as shown in FIG. 4c, the rack is translatorily displaced toward the tip 76 of the surveying probe 10, thereby causing the support 94 and 96 to rotate so as to replace the GPS antennas 14 and 16 in a horizontal position.

It is also contemplated to attached some counterweights to the GPS antennas 14 and 16 in order to obtain self levelling antennas.

One advantage of having an inclined probe is that in situations where it is required to ascertain the position of a point on an upstanding structure, such as a post, the GPS antennas 14 and 16 are spaced from the post thereby preventing the same from creating an obstruction to the reception of the satellite signals by the GPS antennas 14 and 16.

FIG. 5, illustrates a second preferred embodiment of the present invention, wherein the GPS antennas 14 and 16 have been replaced by a pair of spaced-apart adjustable optical prisms, namely corner cubes devices 214 and 216. Such an inclined surveying probe 210 is particularly useful in places where GPS satellite signal cannot be received. As for the first embodiment, the corner cubes 214 and 216 are mounted onto the surveying probe 210 at a known distance from each other and from the probe tip 276 which is in physical contact with the point whose coordinates must be known.

A total station (not shown) of known coordinates and comprising a theodolite and an electronic distance measuring device is provided for measuring the distance that separates the total station and the two corner cubes 214 and 216, as well as the horizontal and vertical angles of respective direction vectors thereof. The horizontality of the corner cubes 214 and 216, unlike for the GPS antennas, is not required. One just has to approximately orient the corner cubes 214 and 216 towards the total station (not shown).

Having these data available, the coordinates of the two corner cubes 214 and 216 may be easily computed, starting from the known coordinates of the total station.

Once the coordinates of the corner cubes 214 and 216 are known, vector calculation is used for calculating the coordinates of the probe tip 276 as per the way described hereinbefore.

In order to have accurate results, the probe 210 must be held in a fixed position during the measurements, and the two corner cubes 214 and 216 have to be placed as far as possible from each other, on the probe 210. According to the second preferred embodiment of the invention, the present probe 210 comprises two corner cubes 214 and 216 placed at a known distance from each other.

Tests held by the Applicant have shown a centremetric accuracy for computing coordinates of difficult-to-reach points using the present surveying probes.

It is also contemplated to provide only one corner cube coupled to a translatory mechanism for determining the coordinates of two spaced-apart points along the longitudinal axis of the surveying probe.

It is further contemplated to provide a surveying probe having a single GPS antenna or a single prism mounted thereto. In this case, the coordinates of the target point in contact with the tip of the probe would be obtained by keeping the tip in contact with this point, while pivoting the probe about the tip thereof in order to take three measurements of three different points in space. By calculation, the coordinates of the centre of the sphere comprising these three points could be obtained and, as the centre of the sphere corresponds to the target point, the position thereof would be ascertained.

If the length of the probe is modified during the measuring process, the intersection of the three spheres, centered at the GPS antenna or prism positions, would provide the coordinates of the target point.

We claim:

1. A surveying probe for ascertaining spatial coordinates of a target point, comprising an inclined elongated body having a longitudinal axis and a tip for contacting the target point, said inclined elongated body having position detecting means mounted thereon for ascertaining spatial coordinates of at least two spaced-apart points disposed on said longitudinal axis of said elongated body, said two points each being located at a predetermined distance from said tip, said distance being invariant as function of an angle of inclination, said angle being inclined such that said tip reaches a difficult-to-reach point substantially vertically inaccessible, and support means spaced from said tip for supporting said elongated body at said inclined angle, said elongated body being in use supported by said tip thereof and said support means, whereby spatial coordinates of the target point may be extrapolated from said two spaced-apart points.

2. A surveying probe as defined in claim 1, wherein said position detecting means include first and second position detecting means mounted to said inclined elongated body at said two spaced-apart points.

3. A surveying probe as defined in claim 2, wherein said first and second position detecting means respectively include first and second satellite navigation system radiowave receiving antennas, said first and second satellite navigation system radiowave receiving antennas being adjustable relative to said inclined elongated body.

4. A surveying probe as defined in claim 2, wherein said first and second position detecting means respectively include first and second optical prisms, said first and second optical prisms being adjustable relative to said inclined elongated body.

5. A surveying probe as defined in claim 2, wherein said first and second position detecting means are adjustable relative to said inclined elongated body.

6. A surveying probe as defined in claim 5, wherein said first and second position detecting means are each supported by bracket means pivotally mounted to said elongated body, said bracket means being connected to a levelling mechanism for adjusting orientation of said first and second position detecting means relative to said inclined elongated body.

7. A surveying probe as defined in claim 6, wherein said levelling mechanism includes transmission means for transmitting motion from a driving means to said bracket means, said driving means being provided with a level to provide information as to how much said driving means have to be rotated to level said first and second position detecting means.

8. A surveying probe as defined in claim 7, wherein said transmission means include an endless flexible member engaged with a first pulley mounted for rotation with said bracket means of said first position detecting means and with a second pulley mounted for rotation with said bracket means of said second position detecting means, and wherein said driving means include a handle drivingly connected to said first pulley, said level being mounted on said handle which is in turn mounted in phase with said bracket means.

9. A surveying probe as defined in claim 7, wherein said transmission means include an elongated toothed rack slidably mounted to said inclined elongated body for axial movements therealong in response to a rotation of said driving means, said bracket means having teeth engaged with said elongated toothed rack such that linear movements of said elongated toothed rack cause said bracket means to rotate in accordance with a rotation of said driving means.

10. A surveying probe as defined in claim 9, wherein said driving means include a handle fixedly mounted to a gearwheel engaged with said elongated toothed rack, and wherein said level include a zenith indicator coupled to a verticality weight, said first and second position detecting means being mounted to said bracket means so as to be horizontally disposed when said handle is aligned with said zenith indicator.

11. A surveying probe as defined in claim 1, wherein said support means comprise a support structure adapted to hold said elongated body at various inclined angles.

12. A surveying probe as defined in claim 11, wherein said inclined elongated body is telescopic, and wherein said support structure includes a pair of telescopic sticks forming a tripod in combination with said tip of said inclined elongated body.

13. A surveying probe as defined in claim 1, wherein said support means comprise a shoulder support.

14. A surveying probe as defined in claim 13, wherein said support means further comprise a handle.

15. A method of ascertaining spatial coordinates of a target point by extrapolation from at least two spaced-apart points, comprising the steps of:

a) putting a tip of an inclined surveying probe in physical contact with a substantially vertically inaccessible target point whose spatial coordinates have to be determined;

b) while maintaining said tip in contact with said target point, measuring spatial coordinates of a sufficient number of points on said inclined surveying probe to enable extrapolation of the spatial coordinates of said target point from said points.

16. A method as defined in claim 15, wherein said points at least include first and second spaced-apart points disposed at a known distance from each other on a common axis passing through said tip of said inclined surveying probe.

17. A method as defined in claim 16, wherein said spatial coordinates of said target point are determined by vector calculation, having available the distance between said first and second points and said tip of said inclined surveying probe.

18. A method as defined in claim 15, wherein step b) includes the steps of ascertaining spatial coordinates of a point disposed on a longitudinal axis of said inclined surveying probe at a predetermined distance from said tip, pivoting said inclined surveying probe about said tip thereof to a second position, ascertaining new spatial coordinates of said point, pivoting said inclined surveying probe about said tip thereof to a third position, ascertaining new spatial coordinates of said point, calculating spatial coordinates of the center of a sphere containing said point in said three different positions thereof, the spatial coordinates of the center of the sphere corresponding to the spatial coordinates of the target point.

19. A method as defined in claim 15, wherein step b) includes the steps of determining spatial coordinates of at least three points on a longitudinal axis of said inclined surveying probe by pivoting said inclined surveying probe about said tip thereof to three different positions, and then calculating spatial coordinates of the intersection of three spheres respectively centered at said three points.

20. A surveying probe for ascertaining spatial coordinates of a target point, comprising an inclined elongated body having a longitudinal axis and a tip for contacting the target point, said inclined elongated body having first and second satellite navigation system radiowave receiving antennas adjustably mounted thereon for simultaneously ascertaining spatial coordinates of at least two spaced-apart points disposed on said longitudinal axis of said elongated body, said first and second satellite navigation system radiowave receiving antennas each being located at a predetermined distance from said tip, said distance being invariant as function of an angle of inclination, said angle being inclined such that said tip reaches a difficult-to-reach point substantially vertically inaccessible, whereby spatial coordinates of the target point may be extrapolated from said two spaced-apart points.

* * * * *